United States Patent
Sugahara

(10) Patent No.: US 7,310,616 B2
(45) Date of Patent: Dec. 18, 2007

(54) METHOD FOR STRUCTURING A TRANSACTION

(75) Inventor: James Takeshi Sugahara, Long Island City, NY (US)

(73) Assignee: Goldman Sachs & Co., New York, NY (US)

( * ) Notice: Subject to any disclaimer, the term of this patent is extended or adjusted under 35 U.S.C. 154(b) by 1425 days.

(21) Appl. No.: 10/062,164

(22) Filed: Feb. 1, 2002

(65) Prior Publication Data
US 2003/0033232 A1 Feb. 13, 2003

Related U.S. Application Data

(63) Continuation-in-part of application No. 09/883,001, filed on Jun. 15, 2001, now Pat. No. 7,236,955.

(51) Int. Cl.
*G06Q 40/00* (2006.01)
(52) U.S. Cl. ...................................................... 705/37
(58) Field of Classification Search ..................... None
See application file for complete search history.

(56) References Cited

U.S. PATENT DOCUMENTS

| 5,826,243 | A | 10/1998 | Musmanno et al. |
|---|---|---|---|
| 5,911,136 | A | 6/1999 | Atkins |
| 6,226,623 | B1 | 5/2001 | Schein et al. |
| 6,304,858 | B1* | 10/2001 | Mosler et al. ................ 705/37 |
| 2002/0128958 | A1* | 9/2002 | Slone ......................... 705/37 |
| 2002/0194109 | A1 | 12/2002 | Takeshi |
| 2004/0143525 | A1* | 7/2004 | Nishimaki ................... 705/35 |

OTHER PUBLICATIONS

Peter Connors and David Kroop, "US Tax Treatment", International Securities Lending, London, Sep.-Nov. 1993, Iss. 7; p. 52.*

* cited by examiner

*Primary Examiner*—Hani M. Kazimi
*Assistant Examiner*—Michael R Zecher
(74) *Attorney, Agent, or Firm*—Greenberg Traurig, LLP

(57) ABSTRACT

In one embodiment the present invention relates to a method for structuring a transaction involving a first party having a long position in a security and a second party desiring to acquire short exposure to the security. In one example an agent or intermediary acts between the first party and the second party. In another example the first party and the second party deal directly with one another.

17 Claims, 6 Drawing Sheets

250
METHOD FOR STRUCTURING A TRANSACTION

CROSS-REFERENCE TO RELATED APPLICATIONS

This application is a continuation-in-part and claims the benefit under 35 U.S.C. 120 of U.S. application Ser. No. 09/883,001, filed Jun. 15, 2001 now U.S. Pat. No. 7,236,955.

FIELD OF THE INVENTION

In one embodiment the present invention relates to a method for structuring a transaction involving a first party having a long position in a security and a second party desiring to acquire short exposure to the security. In one example an agent or intermediary acts between the first party and the second party. In another example the first party and the second party deal directly with one another.

For the purposes of the present application the term "an agreement" (such as an agreement between one party and another party) is intended to include, but not be limited to, a written and/or oral: (a) agreement; (b) contract; (c) arrangement; (d) deal; (e) bargain; (f) covenant; or (g) transaction.

Further, for each term which is identified herein as "intended to include, but not be limited to" certain definition(s), when such term is used in the claims the term is to be construed more specifically as "intended to include at least one of the definition(s)".

BACKGROUND OF THE INVENTION

Traditional stock loan transactions are typically carried out for a number of reasons, including tax purposes, hedge purposes, and "short" sale purposes. A "short" sale is the sale of a security which is not owned by the seller with the expectation that the seller will buy the security at a later date to "close out" the short position (as opposed to a simple sale of a security owned by a seller having a "long" position in the security). A short sale generates short exposure to the party making the short sale.

FIG. 1 shows a cash flow diagram of such a traditional stock loan transaction. As seen in this FIG. 1, a Lender 101 loans one or more Securities 103 to a Borrower 105 (such as a broker) and receives Collateral 107 in return. In addition, the Lender 101 pays to the Borrower 105 a Rebate 109 (i.e., a predetermined amount which may be paid periodically and which may be a percentage of the value of the Collateral 107), and the Borrower 105 pays to the Lender 101 an In-Lieu-Of Dividend 111 (i.e., a manufactured amount calculated to substantially mirror any dividends paid on the Securities 103 lent to the Borrower 105 during the term of the loan). Further, the loan has associated therewith a Mark-To-Market Payment 113 (i.e. "marking a security to market" and then making a payment from the first party to the second party or from the second party to the first party, depending upon the price of the security at the time the security is "marked-to-market"). The Mark-To-Market Payment 113 is made periodically (traditionally daily) and is based on the current price of the underlying Securities 103. The purpose of the Mark-To-Market Payment 113 is to obtain a collateral payment between the Borrower 105 and the Lender 101. Thus, the Mark-To-Market Payment 113 may be made from the Lender 101 to the Borrower 105 or from the Borrower 105 to the Lender 101, depending upon the price of the Securities 103 at the time the periodic Mark-To-Market operation is carried out. Specifically, the Mark-to-Market Payment is paid according to the following calculation: at the first point in time ("t"), the Mark-To-Market Payment is equal to: (1) the value of the security at the point in time the security was lent minus (2) the current value of the security at time t. At the next point in time (t+1), the Mark-To-Market Payment is equal to: (1) the value of the security at time t+1 minus (2) the value of the security at time t. A similar calculation continues for each periodic Mark-To-Market Payment.

In a related type of traditional transaction, such as shown in FIGS. 2A-2C, short synthetic exposure is shown. Short synthetic exposure means exposure that reflects an equivalence to the financial exposure generated by a short sale and typically employs derivatives. Short sales are typically used in trading strategies where investors seek to generate positive returns when securities are dropping in value. There are four general types of trading strategies: (1) arbitrage; (2) hedging; (3) directional short selling; and (4) financing. Further, there may be other more complex strategies that incorporate elements of the basic strategies (e.g., tax trades, complex derivative trades, etc). More particularly, as seen in FIG. 2A, if a Broker 201 maintained a long position in a desired security, such as Stock 203, the Broker 201 (via a trader) could enter into the long side of a short synthetic exposure transaction (via TRR Swap 205) with the Hedge Fund 207 and sell the appropriate number of shares of Stock 203.

On the other hand, if the Broker 201 did not have the required underlying position, then generating the short synthetic exposure generally involved two steps. As seen in FIG. 2B, the Broker 201 (via the trader) would first buy the Stock 203 from an Investor 209 and enter into the short side of the synthetic with the same Investor 209 (via Total Rate of Return Swap "TRR Swap" 211). In step two, seen in FIG. 2C, the Broker 201 (via the trader) would then enter into the long side of a synthetic with the Hedge Fund 207 (via TRR Swap 205) and also sell the appropriate number of shares of Stock 203 (similar to selling from a long "proprietary" position).

The above described "short synthetic exposure" type of traditional transaction suffers many of the following disadvantages:

1) There may be multiple levels of purchases and sales, generating transactions taxes, stamp taxes and broker fees and commissions.
2) The transaction may expose the broker to foreign exchange risk. For example, if currency controls were implemented, it is possible that the broker could not repatriate the cash proceeds of the sale, or generate local currency to "buy-to-hedge" or to "unwind" (e.g., reverse) the transaction. "Buy-to-hedge" refers to the purchase of an asset (e.g., property or a security (including a stock or a derivative, for example)) to hedge an exposure in the opposite direction. Further, the transaction may involve underlying stock or it may involve a derivative or other instrument. For example, a trader may have short exposure in a convertible bond that converts into stock. The trader may elect to "buy-to-hedge" the underlying stock of the convertible, in a ratio that correlates with the conversion ratio of the convertible bond.
3) Issues similar to 2 above might arise if the broker were prevented from trading for some reason.
4) The transaction may impact the broker's balance sheet (when the broker acquires the securities the broker is essentially entering into a hedge).

5) The transaction may have significant reg-cap and cash-cap impact (i.e., the transactions may require the broker to use either regulatory capital (i.e., a minimum amount of capital which is required to be maintained to trade on a certain exchange) and/or cash).
6) Unless the transaction is "reset" (by adjusting the swap price after the initial sale by the investor, for example), mark-to-market exposures may arise. For example, if counterparty A was long the synthetic exposure and counterparty B was short the synthetic exposure, if the assets(s) represented by the transaction went up in price, counterparty A would have the risk since counterparty B would have an obligation to pay counterparty A at some point in the future. If the assets(s) went down in price, the opposite would be true.

Figure 1:
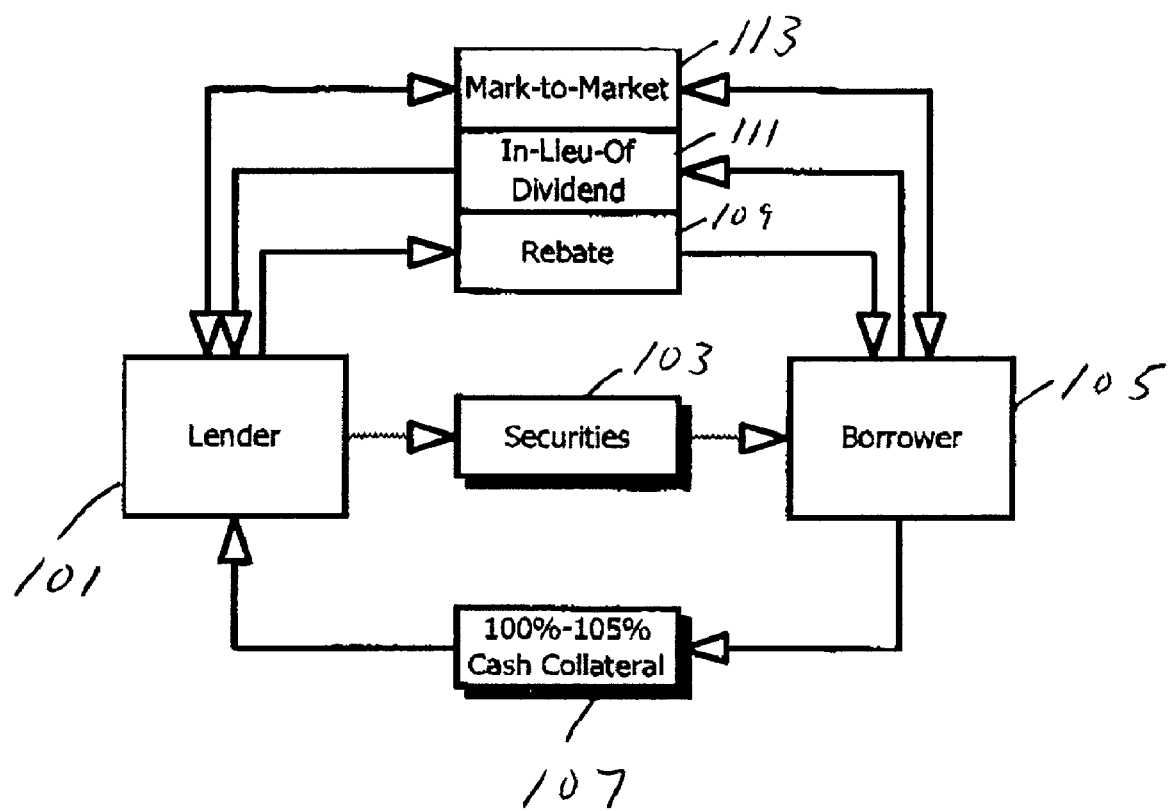
FIG. 1 shows a cash flow diagram of a traditional stock loan transaction.
Figure 2A:
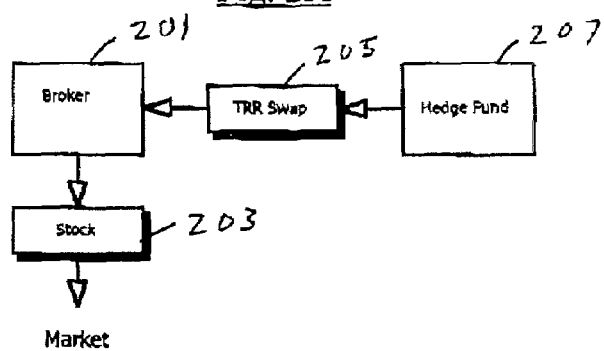
FIGS. 2A-2C show block diagrams of a traditional short synthetic exposure transaction.
Figure 2B:
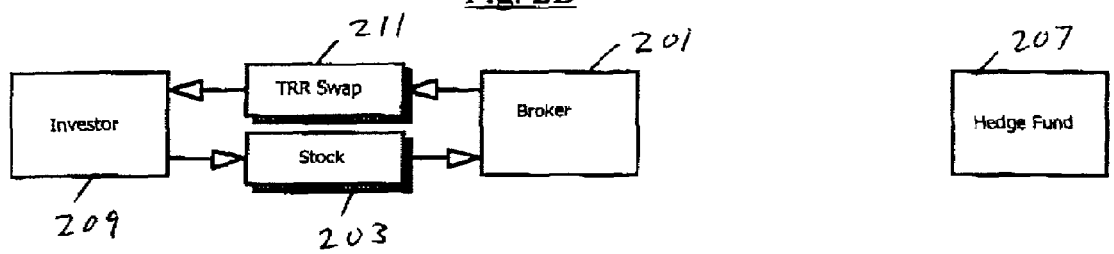
Figure 2C:
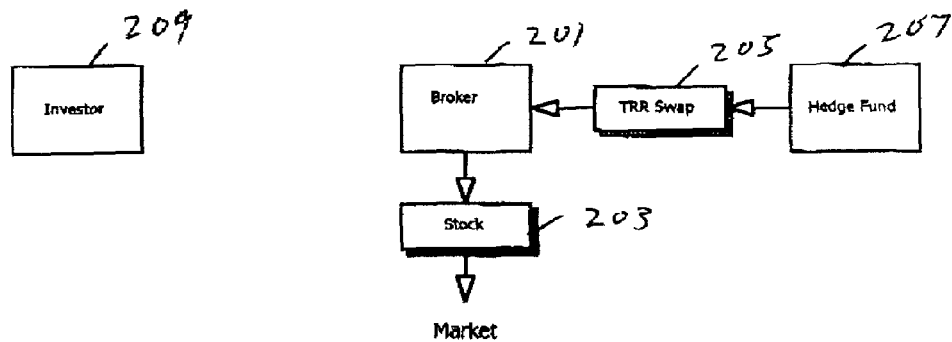

Among those benefits and improvements that have been disclosed, other objects and advantages of this invention will become apparent from the following description taken in conjunction with the accompanying figures. The figures constitute a part of this specification and include an illustrative embodiment of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for structuring a transaction is provided, comprising: obligating an agent to act between a first party and a second party; obligating the first party to sell a security to the second party; obligating the second party to pay an in-lieu-of dividend to the first party; periodically marking the security sold by the first party to market; and obligating the first party and the second party to unwind the sale of the security.

In one example the step of periodically marking the security sold by the first party may further comprise periodically making a marking payment from the first party to the second party or from the second party to the first party, depending upon the price of the security at the time the security is marked-to-market.

In another example short exposure to the security may be provided to the second party based upon the sale of the security by the first party.

In another example short exposure to the security may provided to the second party, through the agent, based upon the sale of the security by the first party.

In another example at least one of the in-lieu-of dividend and the marking payment may be paid through the agent.

In another example at least one of: (a) the identity of the first party may not be known to the second party; and (b) the identity of the second party may not be known to the first party.

In another example the step of obligating the first party and the second party to unwind the sale of the security may include obligating the first party to repurchase the security from the second party.

In another example the method may further comprise obligating the agent to at least partially indemnify the first party against a loss.

In another example the loss may be caused by the second party failing to carry out an obligation under the transaction.

In another example the first party may retain the proceeds of the sale of the security.

In another example the method may comprise obligating the first party to make a payment to the second party.

In another example the payment may be paid periodically using a period selected from the group including: a) daily; b) weekly; c) monthly; d) quarterly; e) semi-annually; f) annually; and g) at the completion of the transaction.

In another example the in-lieu-of dividend may equal at least part of the value of any dividend paid on the security sold by the first party.

In another example the in-lieu-of dividend may be paid periodically using a period selected from the group including: a) daily; b) weekly; c) monthly; d) quarterly; e) semi-annually; f) annually; and g) at or about the period which is correlated with the payment of any dividend paid on the security sold by the first party.

In another example the marking may be carried out in U.S. dollars.

In another example the marking may be carried out periodically using a period selected from the group including: a) daily; b) weekly; c) monthly; d) quarterly; e) semi-annually; and f) annually.

In another example security may be selected from the group including: a) at least one fixed income security; b) at least one warrant; c) at least one stock; d) at least one option; e) at least one convertible bond; f) at least one non-convertible bond; and g) at least one future.

In another example the security may be selected from the group including: a) at least one security associated with a single stock issue; b) at least one security associated with a basket of stocks formed of a plurality of stock issues; and c) at least one security associated with a stock index.

In another example the first party may have a long position in the security.

In another example the first party may be an institutional investor.

In another example the second party may be a hedge fund.

In another embodiment a method for structuring a transaction carried out among a first party, a second party, and a third party is provided, comprising: arranging a first agreement between the first party and the second party, wherein the first agreement: i) obligates the first party to sell a security to the third party; ii) obligates the second party to pay a first in-lieu-of dividend to the first party; iii) requires the first periodic marking of the security sold by the first party to market; and iv) obligates the first party to unwind the sale of the security to the third party; and arranging a second agreement between the second party and the third party, wherein the second agreement: i) obligates the third party to pay a second in-lieu-of dividend to the second party; ii) requires the second periodic marking of the security sold by the first party to market; and iii) obligates the third party to unwind the sale of the security made by the first party.

In another example: (a) the first periodic marking of the security sold by the first party may comprise making a first marking payment from the first party to the second party or from the second party to the first party, depending upon the price of the security at the time the security is marked-to-market; and (b) the second periodic marking of the security sold by the first party may comprise making a second marking payment from the second party to the third party or from the third party to the second party, depending upon the price of the security at the time the security is marked-to-market.

In another example short exposure to the security may be provided to the third party based upon the sale of the security by the first party.

In another example short exposure to the security may be provided to the third party, through the second party, based upon the sale of the security by the first party.

In another example at least one of: (a) the identity of the first party may not be known to the third party; and (b) the identity of the third party may not be known to the first party.

In another example the step of obligating the first party to unwind the sale of the security to the third party may include obligating the first party to repurchase the security from the third party and the step of obligating the third party to unwind the sale of the security made by the first party may include obligating the third party to resell the security to the first party.

In another example the first party may retain the proceeds of the sale of the security.

In another example the method may further comprise obligating the first party to make a first payment to the second party and obligating the second party to make a second payment to the third party.

In another example each of the first payment and the second payment may be paid periodically using a period selected from the group including: a) daily; b) weekly; c) monthly; d) quarterly; e) semi-annually; f) annually; and g) at the completion of the transaction.

In another example each of the first in-lieu-of dividend and the second in-lieu-of dividend may equal at least part of the value of any dividend paid on the security sold by the first party.

In another example each of the first in-lieu-of dividend and the second in-lieu-of dividend may be paid periodically using a period selected from the group including: a) daily; b) weekly; c) monthly; d) quarterly; e) semi-annually; f) annually; and g) at or about the period which is correlated with the payment of any dividend paid on the security sold by the first party.

In another example each of the first marking and the second marking may be carried out in U.S. dollars.

In another example each of the first marking and the second marking may be carried out periodically using a period selected from the group including: a) daily; b) weekly; c) monthly; d) quarterly; e) semi-annually; and f) annually.

In another example the security may be selected from the group including: a) at least one fixed income security; b) at least one warrant; c) at least one stock; d) at least one option; e) at least one convertible bond; f) at least one non-convertible bond; and g) at least one future.

In another example the security may be selected from the group including: a) at least one security associated with a single stock issue; b) at least one security associated with a basket of stocks formed of a plurality of stock issues; and c) at least one security associated with a stock index.

In another example the first party may have a long position in the security.

In another example the first party may be an institutional investor.

In another example the third party may be a hedge fund.

In another embodiment a method for structuring a transaction carried out among a first party, a second party, and a third party is provided, comprising: obligating the first party to sell a security to the third party; obligating the second party to pay a first in-lieu-of dividend to the first party; requiring the first periodic marking of the security sold by the first party to market; obligating the third party to pay a second in-lieu-of dividend to the second party; requiring the second periodic marking of the security sold by the first party to market; and obligating the first party and the third party to unwind the sale of the security made by the first party.

In another example the method may further comprise obligating the first party to make a first payment to the second party and obligating the second party to make a second payment to the third party.

In another embodiment a method for structuring a transaction is provided, comprising: obligating a first party to sell a security to a second party; obligating the second party to pay an in-lieu-of dividend to the first party; periodically marking the security sold by the first party to market by periodically making a marking payment from the first party to the second party or from the second party to the first party, depending upon the price of the security at the time the security is marked-to-market; and obligating the first party and the second party to unwind the sale of the security by obligating the first party to repurchase the security from the second party; wherein short exposure to the security is provided to the second party based upon the sale of the security by the first party.

In another embodiment a method for structuring a transaction is provided, comprising: selling a security into a market by a first party at a predetermined time; paying interest by the first party to a second party; paying a dividend equivalent by the second party to the first party; periodically marking the security sold by the first party; and arranging an agreement between the second party and a third party, wherein the agreement provides, to the third party, short exposure to the security based upon the sale of the security by the first party.

In one example, the predetermined time may include a predetermined calendar date. The predetermined time may include a predetermined hour. For the purposes of the present application, the term "time" is intended to include, but not be limited to, the point, period, or moment when something occurs, happens, begins, or ends (e.g., a particular hour, minute or second of the day; a particular calendar date; a particular day of the week; a particular week of the year; and a particular year).

The first party may retain the proceeds of the sale of the security.

The interest may be paid periodically using a period selected from the group including, but not limited to: a) daily; b) weekly; c) monthly; d) quarterly; e) semi-annually;

and f) annually. In another embodiment, the interest may be paid at the completion of the transaction.

The dividend equivalent may equal at least part of the value of any dividend paid on the security sold by the first party. The dividend equivalent may be paid periodically using a period selected from the group including, but not limited to: a) daily; b) weekly; c) monthly; d) quarterly; e) semi-annually; and f) annually. In another embodiment, the dividend equivalent may be paid at or about the time period which is correlated with the payment of the dividend.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment a method for structuring a transaction is provided, comprising: obligating a first party to sell a security into a market at a predetermined time under a first agreement with a second party; and arranging a second agreement between the second party and a third party, wherein the second agreement provides, to the third party, short exposure to the security based upon the sale of the security by the first party.

In one example, the first party may be an institutional investor. The third party may be a hedge fund.

The predetermined time may include a predetermined calendar date. The predetermined time may include a predetermined hour.

The first party may retain the proceeds of the sale of the security.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment, method for structuring a transaction is provided, comprising: arranging a first agreement between a first party and a second party, wherein the first agreement requires the first party to sell a security into a market; and arranging a second agreement between the second party and a third party, wherein the second agreement provides, to the third party, short exposure to the security based upon the sale of the security by the first party made under the first agreement.

In one example, first party may be an institutional investor. The third party may be a hedge fund.

The first agreement may further comprise requiring the first party to sell the security into the market at a predetermined time. The first agreement may further comprise requiring the first party to pay interest to the second party. The first agreement may further comprise requiring the second party to pay a dividend equivalent to the first party. The first agreement may further comprise requiring periodic marking of the security sold by the first party.

The predetermined time may include a predetermined calendar date. The predetermined time may include a predetermined hour.

The first party may retain the proceeds of the sale of the security.

The interest may be paid periodically using a period selected from the group including, but not limited to: a) daily; b) weekly; c) monthly; d) quarterly; e) semi-annually; and f) annually In another embodiment, the interest may be paid at the completion of the transaction.

The dividend equivalent may equal at least part of the value of any dividend paid on the security sold by the first party. The dividend equivalent may be paid periodically using a period selected from the group including, but not limited to: a) daily; b) weekly; c) monthly; d) quarterly; e) semi-annually; and f) annually. In another embodiment, the dividend equivalent may be paid at or about the time period which is correlated with the payment of the dividend.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

In another embodiment a method for structuring a transaction is provided, comprising: arranging a first agreement between a first party and a second party, wherein the first agreement requires the first party to sell a security into a market at a predetermined time; paying interest by the first party to the second party; paying a dividend equivalent by the second party to the first party; periodically marking the security sold by the first party; and arranging a second agreement between the second party and a third party, wherein the second agreement provides, to the third party, short exposure to the security based upon the sale of the security by the first party made under the first agreement.

In one example, the first party may be an institutional investor. The third party may be a hedge fund.

The predetermined time may include a predetermined calendar date. The predetermined time may include a predetermined hour.

The first party may retain the proceeds of the sale of the security.

The interest may be paid periodically using a period selected from the group including: a) daily; b) weekly; c) monthly; d) quarterly; e) semi-annually; and f) annually.

The dividend equivalent may equal at least part of the value of any dividend paid on the security sold by the first party. The dividend equivalent may be paid periodically using a period selected from the group including: a) daily; b) weekly; c) monthly; d) quarterly; e) semi-annually; and f) annually.

The marking may also include requiring a payment from the first party to the second party or from the second party to the first party, depending upon the price of the security at the time the security is marked-to market. The marking may be carried out in U.S. dollars or other currency deemed appropriate. The marking may be carried out periodically using a period selected from the group including: a) daily; b) weekly; c) monthly; d) quarterly; e) semi-annually; and f) annually.

The security may be selected from the group including: a) at least one fixed income security; b) at least one warrant; c) at least one stock; d) at least one option; e) at least one convertible bond; f) at least one non-convertible bond; and g) at least one future.

The security may be selected from the group including: a) at least one security associated with a single stock issue; b) at least one security associated with a basket of stocks formed of a plurality of stock issues; and c) at least one security associated with a stock index.

The first party may have a long position in the security.

Figure 3:
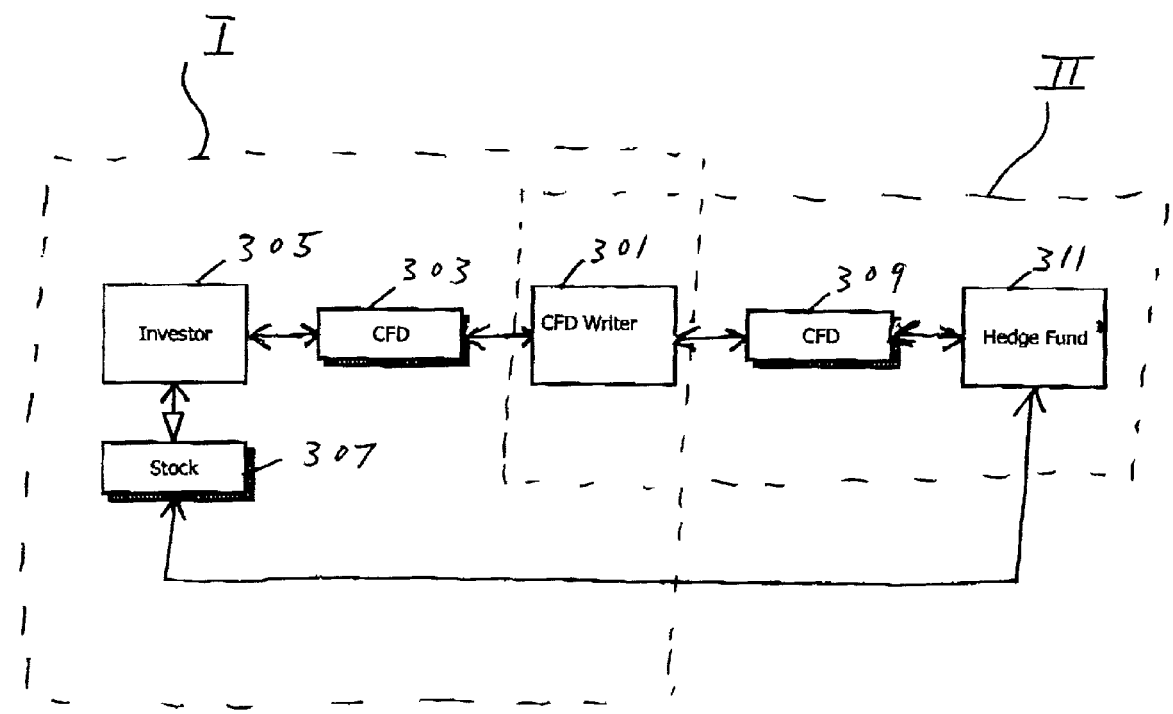
FIG. 3 shows a block diagram of an embodiment of the present invention.

Referring now to FIG. 3, a block diagram of a Short Synthetic Market Access Trade ("SSMAT") according to another embodiment of the present invention is shown. While there are numerous markets in which actual short selling is not possible (whether due to legal/regulatory issues, tax issues, cost, lack of stock transfer mechanisms, and/or reputational concerns that relate either to short selling or borrowing stock), the SSMAT of the present embodiment may permit the generation of short synthetic exposure (e.g., financial exposure that essentially mirrors the financial exposure generated by a short sale). Moreover, although this example describes a Hedge Fund, it is understood that the present invention applies to any counterpart desiring to gain a short exposure (e.g. individual or group).

In general terms, the SSMAT of the present embodiment is essentially a back-to-back cash settled derivatives transaction or "contracts-for-differences" ("CFD"), where a "long" investor sells stock to a counterpart desiring to gain a short exposure (and the investor repurchases the stock at a future time).

More particularly, as seen in the section of FIG. 3 labeled I, a CFD Writer 301 writes a CFD 303 (which could be a non-collateral CFD, for example) with an Investor 305 to arrange the sale of Stock 307 by Investor 305 and to replace the long exposure of Investor 305 with synthetic exposure (i.e., the synthetic exposure may be financial exposure that essentially mirrors the financial exposure generated by a long position in Stock 307).

Further, as seen in the section of FIG. 3 labeled II, CFD Writer 301 writes CFD 309 (which could be a non-collateral CFD, for example) with Hedge Fund 311 to pass to Hedge Fund 311 the short synthetic exposure generated by CFD 303.

Still referring to FIG. 3, the mechanics of an SSMAT transaction according to the present embodiment may operate as follows:

a) Hedge Fund 311 (or its agent, collectively referred to as "Hedge Fund 311") contacts CFD Writer 301 (or its agent, collectively referred to as "CFD Writer 301") for short synthetic exposure. To minimize the number of transactions, CFD Writer 301 may ask Hedge Fund 311 what its maximum expected short exposure is. The "fee" and other terms of CFD 309 are agreed upon, including term (e.g., expiration date and/or time) and any early termination penalties.

b) CFD Writer 301 finds a "lending" counterpart (i.e., Investor 305 (or its agent, collectively referred to as "Investor 305")). Once identified, CFD Writer 301 and the counterpart negotiate the terms of CFD 303, including the rate and period of interest to be paid by the counterpart, the time period (e.g. date and/or time) of the sale, the term (e.g., expiration date and/or time), and any early termination penalties.

c) CFD Writer 301 contacts Hedge Fund 311 to convey the date and time of the proposed sale (and Hedge Fund 311 may be given the option of approving or disapproving). If Hedge Fund 311 approves, the final share quantity represented by CFD 309 may be determined by the share quantity sold by the "lending" counterpart. Further, the initial price of CFD 309 (i.e., the "strike" price) may be set to the average price of the shares sold. In markets that allow "crossing", CFD Writer 301 may provide Hedge Fund 3511 with the option to cross (or Hedge Fund 311 may be required to cross). In one example, a "crossing" may occur when a broker receives two opposite orders that it can match. If, for example, the broker receives a buy order for 100,000 shares of a stock and also receives a sell order for 100,000 shares of the same stock, then in certain exchanges the broker can execute a cross trade between the buy and the sell and then report the transaction to the exchange. The same option/requirement to cross may be applied to the transaction "unwind". Where crossing is not required and/or possible, Hedge Fund 311 may be notified of the proposed time of the sale by the "lending" counterpart to allow the Hedge Fund 511 to provide the natural buy-side of the sale. Again, the same may occur for the "unwind" portion of the transaction. Further still, Hedge Fund 311 may adjust its short exposure by either buying or selling stock in the market. Moreover, CFD 309 may be booked into an account associated with Hedge Fund 311, transactions may appear on any account statements, marking may be performed periodically (e.g., daily), and a margining process may be provided. It is noted that hedge funds often prefer to "short" at their own discretion, and large market-open/close sales could significantly impact pricing. Thus, CFD Writer 301 could urge both counterparts to execute through CFD Writer 301 itself, so that CFD Writer 301 would have maximum control over the transaction.

Figure 5:
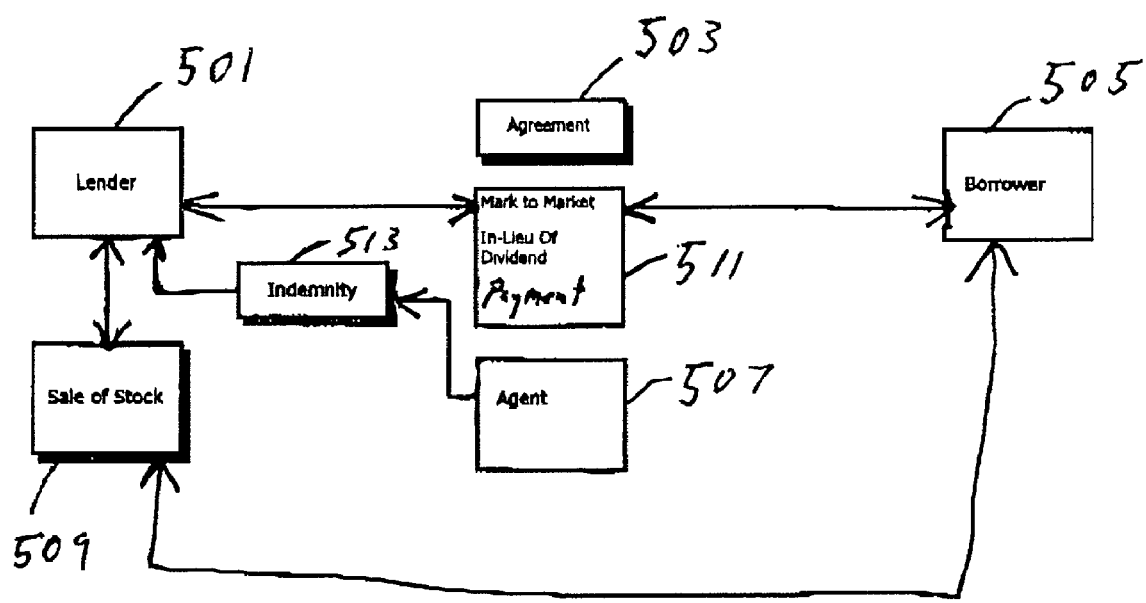
FIG. 5 shows a block diagram of an embodiment of the present invention.

With regard to the cash flow between the parties shown in Section I of FIG. 5, it is noted that the cash flow may be structured to substantially mirror the cash flow of the traditional stock loan transaction of FIG. 1.

Figure 4:
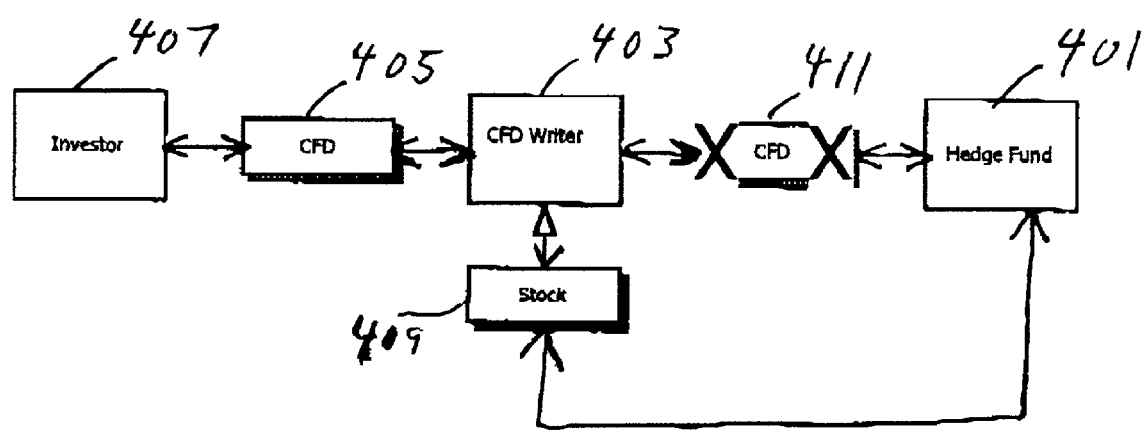
FIG. 4 shows a block diagram of an embodiment of the present invention.

Referring now to FIG. 4, early unwinding of the SSMAT transaction of the present embodiment will now be discussed.

If Hedge Fund 401 chooses to unwind prior to the agreed upon date and/or time then there may be two options:

1) CFD Writer 403 may terminate CFD 405 (i.e., the one facing the Investor 407). If this is done then CFD Writer 403 may be assessed a penalty owed to Investor 407 (such penalty could be passed on to Hedge Fund 401).

2) CFD Writer 403 may purchase Stock 409 and terminate the second CFD 411 (i.e., the one facing Hedge Fund 401) at the purchase cost. CFD Writer 403 could then write a third CFD (not shown) by selling the long stock position. It is noted that this option introduces some incremental risk to CFD Writer 403.

On the other hand, if Investor 407 chooses to unwind prior to the agreed upon date and/or time, then Investor 407 may be required to: a) provide a one settlement cycle recall period before CFD 405 is unwound; and b) pay a penalty to CFD Writer 403 (which may be passed on to Hedge Fund 401).

It is noted that in some instances a potential Investor (e.g., an Institutional Investor) may not have the appropriate systems and infrastructure in place to participate in a transaction according to the present invention. That is, the potential Investor may not have the systems and infrastructure in place to track mark-to-market, dividend equivalent, and interest payments, for example. Therefore, in another embodiment of the present invention an agent possessing or having access to the appropriate systems and infrastructure may be utilized to "stand in the shoes of" the potential Investor.

Further, it is noted that with regard to participation by certain investors (e.g., Institutional Investors), traditional derivative transactions and/or financing transactions may be governed by various margin regulations and "customer protection" regulations (e.g., Rule 15a-6). In this regard, it is believed that when the CFD's of the instant invention are implemented as non-securities such margin regulations and "customer protection" regulations would not apply (thus providing broader investment options to such investors).

By operating as described above, the present invention may provide a mechanism through which a CFD Writer is not involved in the cash side of a transaction (i.e., the CFD Writer is not actually buying or selling stock, as a traditional broker might during a traditional transaction).

Further, when the CFD Writer is not involved in the cash side of a transaction, the present invention may provide a mechanism through which the CFD Writer is not exposed to foreign exchange risk, as a traditional broker might be during a traditional transaction (except to the extent that the CFD Writer chooses to hedge the synthetic versus stock).

Further, when the CFD Writer is not involved in the cash side of a transaction, the present invention may provide a mechanism through which the CFD Writer is not exposed to the risk of being prevented from trading a security, as a traditional broker might be during a traditional transaction.

Further, when the CFD Writer is not involved in the cash side of a transaction, the present invention may provide a mechanism through which the balance sheet of the CFD Writer is not significantly impacted, as can occur to a traditional broker during a traditional transaction.

Further, when the CFD Writer is not involved in the cash side of a transaction, the present invention may provide a mechanism through which the CFD Writer is not exposed a significant "reg-cap" and "cash-cap" impact, as can occur to a traditional broker during a traditional transaction.

Further, when the CFD between the Investor and the CFD Writer is marked-to-market periodically (e.g., daily), the CFD Writer does not take on significant mark-to-market exposure, as can occur to a traditional broker during a traditional transaction.

Further, the party seeking to acquire the short synthetic exposure (e.g., a hedge fund) may be given the opportunity to "cross" or be the natural buy side to the Investor sale, the hedge fund may be able to dictate when to sell shares to provide the short synthetic exposure.

Further, the present invention provides a mechanism through which an investor may embed transaction taxes, stamp taxes, and sales fees and commissions into a CFD and such costs could be passed on to a party acquiring the short synthetic exposure (e.g., a hedge fund).

Further, the present invention provides a mechanism through which an investor may "see" a cash flow which essentially mirrors the cash flow of a traditional securities lending transaction.

Referring now to FIG. 5, a block diagram of a synthetic loan transaction ("SLoT") mechanism according to an embodiment of the present invention is shown. This embodiment of the SLoT mechanism will hereinafter be referred to as an "agency type" SLoT mechanism. This "agency type" SLoT mechanism is appropriate for use in the event Lender 501 is not tax-exempt and/or desires to utilize a tax structure which, it is believed, would not trigger U.S. level capital gains tax for U.S. investors. Further, the "agency type" SLoT mechanism of this embodiment may be used to synthetically replicate the economics of a securities lending transaction. As such, the "agency type" SLoT mechanism of this embodiment may be used by an investor to: (a) fund a long position; and/or (b) synthetically lend one or more securities; and/or (c) leverage its portfolio of securities Still referring to FIG. 5, it is seen that the "agency type" SLoT transaction of this embodiment may operate as follows. Agreement 503 may be used to bind Lender 501 (e.g., an institutional investor) and Borrower 505 (e.g. a Hedge Fund) through Agent 507 (e.g., a broker/dealer or a bank (such as an investment bank, for example)). Agreement 503 may be a single agreement binding Lender 501 and Borrower 505 through Agent 507 or Agreement 503 may comprise two agreements, each binding one of Lender 501 and Borrower 505 through Agent 507. Further In one example, which example is intended to be illustrative and not restrictive, the identities of Lender 501 and Borrower 505 may remain undisclosed to one another. In another example, which example is intended to be illustrative and not restrictive, the identities of each of Lender 501 and Borrower 505 may be disclosed to one another (or the identity of only one party may be disclosed to the other). In any case, Agent 507 may provide servicing for Lender 501 (e.g., responsibility for a significant portion of the operational tasks related to the transaction).

More particularly, the mechanics of an "agency type" "SLoT" transaction according to one specific example, which example is intended to be illustrative and not restrictive, may operate as follows:

a) Agent 507 and the Lender 501 may agree that Lender 501 sell (and then repurchase therefrom) a desired number of shares of Stock 509 to an interested Borrower 507 on terms satisfactory to the parties. Such terms may include, but are not limited to, a "fee" and other terms such as the transaction expiration date and/or time, any early termination clauses, and the date and time of the proposed sale by Lender 501 of Stock 509. Further still, Agreement 503 may stipulate that the execution price of the sale of Stock 509 by Lender 501 establishes the original mark price for the purposes of the present embodiment.

b) Agent 507 and Borrower 505 may agree that Borrower 505 will be sold Stock 509 on the terms agreed to by Lender 501.

c) On the sale date Lender 501 may report to Agent 707 the average execution price of the sale of the share(s). If the sale is executed through Agent 507 then there may be no need to report.

d) On a periodic basis (e.g., daily) Agent 507 may contact Lender 501 and/or Borrower 505 to confirm and transfer any required Payments 511 (e.g., mark-to-market amounts, other payments, in-lieu-of dividends, and/or fees).

e) On the termination date of the transaction, Lender 501 repurchases Stock 509 from Borrower 505. Lender 501 may report to Agent 507 the repurchase price (e.g., average execution price, market open, market close, or Volume Weighted Average Price "VWAP")), which may be used as the final mark-to-market price for the purposes of unwinding the transaction. If the purchase is executed through Agent 507 then there may be no need to report. Of note, an example of VWAP is as follows: If 100 shares were sold at 20, 200 shares at 25, and 300 shares at 30, VWAP=[(100×20)+ (2000×25)+(300×30)]/[100+200+300]=26.67.

f) If Lender 501 or Borrower 505 seeks early termination of the transaction then such party seeking early termination may be required to pay a penalty fee to the other in a pre-agreed amount. Following traditional stock loan conventions, the early termination date may be one settlement cycle from the date of notification (the date and time of the early termination following the notification may, of course, be any agreed date and time.

Of note, in one embodiment of the present invention the "agency type" SLoT mechanism must involve crossing transactions between Lender 501 and Borrower 505 both at the onset and unwinding of the transaction.

Further still, in one embodiment of the present invention there may be a form of Indemnification 513 that Agent 507 grants Lender 501 against certain losses that Lender 501 may incur due to default on the part of Borrower 505

Further still, the execution of mark-to-markets, payments of in-lieu-of dividends, recall methodology, and calculation of fees, rebates, or other payments may be carried out in a manner similar to that utilized in the traditional stock loan transaction of FIG. 1.

Figure 6:
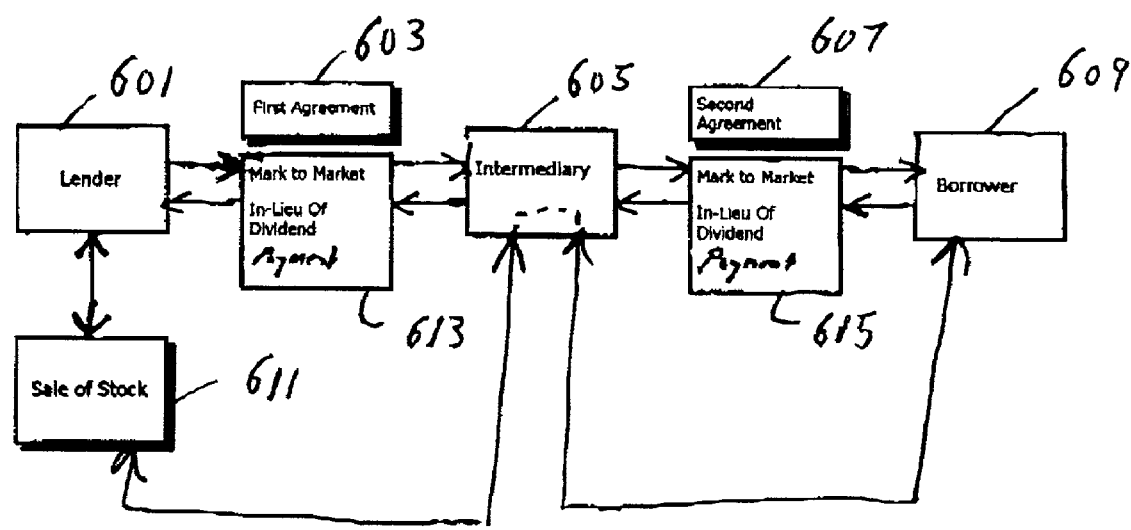
FIG. 6 shows a block diagram of an embodiment of the present invention.

Referring now to FIG. 6, a block diagram of another "SLoT" mechanism according to an embodiment of the present invention is shown. This embodiment of the SLoT mechanism will hereinafter be referred to as a "principal type" SLoT mechanism. This "principal type" SLoT mechanism is appropriate for use in the event Lender 601 is tax-exempt, for example. Further, the "principal type" SLoT mechanism of this embodiment may be used to synthetically replicate the economics of a securities lending transaction. As such, the "principal type" SLoT mechanism of this embodiment may be used by an investor to: (a) fund a long position; and/or (b) synthetically lend one or more securities; and/or (c) leverage its portfolio of securities.

Still referring to FIG. 6, it is seen that the "principal type" SLoT transaction of this embodiment may operate as follows. First Agreement 603 may be used to bind Lender 601 (e.g., an institutional investor) and Intermediary 605 (e.g., a broker/dealer or a bank (an investment bank, for example) and Second Agreement 607 may be used to bind Intermediary 605 and Borrower 609 (e.g. a Hedge Fund). In one example, which example is intended to be illustrative and not restrictive, the identities of Lender 601 and Borrower 609 may remain undisclosed to one another. In another example, which example is intended to be illustrative and not restrictive, the identities of each of Lender 601 and Borrower 609 may be disclosed to one another (or the identity of only one party may be disclosed to the other). In any case, Intermediary 605 may provide servicing for the transactions for one or both of Lender 601 and Borrower 609 (e.g., responsibility for a significant portion of the operational tasks related to the transactions).

More particularly, the mechanics of a "principal type" "SLoT" transaction according to one specific example, which example is intended to be illustrative and not restrictive, may operate as follows:

a) Lender 601 and Intermediary 605 may agree that Lender 601 sell (and then repurchase therefrom) a desired number of share(s) of Stock 611 to Intermediary 605 on terms satisfactory to the parties. Such terms may include, but are not limited to, a "fee" and other terms such as the transaction expiration date and/or time, any early termination clauses, and the date and time of the proposed sale by Lender 601 of Stock 611. Further still, Agreement 603 may stipulate that the execution price of the sale of Stock 611 by Lender 601 establishes the original mark price for the purposes of the present embodiment.

b) Borrower 609 and Intermediary 605 may agree that Intermediary 605 sell (and then repurchase therefrom) Stock 611 sold by Lender 601 to Borrower 609 on terms satisfactory to the parties. Such terms may include, but are not limited to, a "fee" and other terms such as the transaction expiration date and/or time, any early termination clauses, and the date and time of the proposed sale by Lender 601 and/or Intermediary 605 of Stock 611. Further still, Agreement 607 may stipulate that the execution price of the sale of Stock 611 by Lender 601 establishes the original mark price for the purposes of the present embodiment c) On the sale date Lender 601 may report to Intermediary 605 the average execution price of the sale of the share(s). If the sale is executed through Intermediary 605 then there may be no need to report. Further, Intermediary 605 may report to Borrower 607 the average execution price of the sale of the share(s)

d) On a periodic basis (e.g., daily) Intermediary 605 may contact Lender 601 to confirm and transfer any required Payments 613 (e.g., mark-to-market amounts, other payments, in-lieu-of dividends, and/or fees). Further, on a periodic basis (e.g., daily) Intermediary 605 may contact Borrower 609 to confirm and transfer any required Payments 815 (e.g., mark-to-market amounts, other payments, in-lieu-of dividends, and/or fees).

e) In the case of a "cash settled" transaction, the transaction may unwind in a manner similar to that of a "buy-in"—where "cash collateral" is used by Lender 601 to repurchase Stock 611, and any excess amount of cash is returned to Borrower 609 or, in the case where there is insufficient cash, Borrower 609 may be required to make Lender 601 whole. On the other hand, in the case of a "stock settled" transaction, crossing trades may be executed similar to that described for the "agency type" SLoT mechanism. In either case, the method of "settlement" may be set at the onset of the transaction.

f) If any party seeks early termination of the transaction then such party seeking early termination may be required to pay a penalty fee to one or both of the other parties in a pre-agreed amount. Following traditional stock loan conventions, the early termination date may be one settlement cycle from the date of notification (the date and time of the early termination following the notification may, of course, be any agreed date and time).

Of note, in one embodiment of the present invention the "principal type" SLoT mechanism must involve crossing transactions among Lender 601, Intermediary 605, and Borrower 609 both at the onset and unwinding of the transaction.

Further still, the execution of mark-to-markets, payments of in-lieu-of dividends, recall methodology, and calculation of fees, and other payments may be carried out in manner similar to that utilized in the traditional stock loan transaction of FIG. 1.

In another embodiment of the present invention the Agent or Intermediary may be a credit intermediary and/or may shelter the Lender from the Borrower (in terms of risk, for example).

In another embodiment of the present invention a mechanism may be provided to essentially mimic a traditional stock loan (e.g., for tax purposes).

In another embodiment of the present invention a mechanism may be provided for arranging an essentially simultaneous sale and purchase of an asset (e.g., a security such as a stock).

In another embodiment of the present invention a mechanism may be provided to unwind a transaction between a number of parties. Such unwinding may occur between the same counterparties which had interacted with one another.

In another embodiment of the present invention a mechanism may be provided to permit a "tax efficient" transaction (e.g., a transaction which will not trigger adverse U.S. tax consequences such as capital gains under the appropriate circumstances). It is believed that such a tax efficient transaction may be structured as a "loan" from a U.S. tax perspective, wherein at least a lender and a borrower agree to reverse the "loan" at a future point in time.

In another embodiment of the present invention a mechanism may be provided for structuring a stock "loan" agreement, wherein asset(s) that are transferred are, at a later date, transferred back. Such a stock "loan" may comprise a "loan" of one or more assets (such as one or more stocks) against collateral (which may or may not be a set amount), wherein the "loan" is reversed at a future time (which time may or may not be a predetermined future time).

In another embodiment of the present invention a mechanism may be provided to structure a transaction as a "loan" (under which it is believed U.S. capital gains taxes would not apply), rather than as a sale (under which it is believed U.S. capital gains taxes would apply).

While a number of embodiments of the present invention have been described, it is understood that these embodiments are illustrative only, and not restrictive, and that many modifications may become apparent to those of ordinary skill in the art. For example, the present invention may be utilized with a transaction involving one or more shares of a security associated with a single entity, one or more shares of a security associated with a plurality of entities (e.g., a "basket" of securities), or one or more shares of a security associated with an index. Further still, the present invention may be used with multiple Lenders (e.g., multiple Investors) and/or multiple Borrowers (e.g., multiple Hedge Funds), and/or multiple Intermediaries (e.g., multiple broker/dealers or multiple investment banks) and/or multiple Agents (e.g., multiple broker/dealers or multiple investment banks). For example, a number of Investors may be used to provide a desired short synthetic exposure to one Hedge Fund (possibly through one or more Intermediaries and/or Agents), or a number of Hedge Funds may receive the short synthetic exposure provided by one Investor (possibly through one or more Intermediaries and/or Agents), or a number of Investors may be used to provide a desired short synthetic exposure to a number of Hedge Funds (possibly through one ore more Intermediaries and/or Agents). Further still, the CFD Writer may pre-arrange a number of CFD's with one or more Investors to have an "inventory" of such ready to match-up with one or more counterpart Hedge Fund CFD's when desired. Further still, the CFD Writer may pre-arrange a number of CFD's with one or more Hedge Funds to have a "inventory" of such CFD's ready to match-up with one or more counterpart Investor CFD's when desired. Further still, the CFD's of the present invention and/or the exposure ("long" and/or short") generated by the CFD's of the present invention may be placed in "inventory" (maintained by the CFD Writer and/or another entity, such as a clearinghouse) and such inventory may be searched and/or accessed and/or "booked" (e.g., sold) by an appropriate computer system. Likewise, the Agent and/or Intermediary may maintain an "inventory" of agreements. Further still, the present invention may be utilized for tax arbitrage. Further still, the present invention may be used in a market in which a security can not be sold short (e.g., an "emerging market" such as Taiwan or Indonesia) and/or in a market in which securities lending is not available or possible. Further still, a transaction according to the present invention may require specific documentation, such as a Master International Securities Dealers Association "ISDA" Agreement, a CFD Annex to the ISDA Agreement, and a short form Confirmation for each CFD, for example. Further still, while the "strike" price of the CFD (and the repurchase price thereof) have been described as possibly being the average execution price (of a number of shares of stock), the price could alternatively be the price of a single share of stock (if only one share is sold), the weighted average price of a number of shares of stock (wherein the weighting factor is any desired weighting factor), the highest price of any of the shares sold, the lowest price of any of the shares sold, or any other desired calculated value, for example. Further still, while the price of the stock (and the repurchase price thereof) have been described as possibly being the average execution price (of a number of shares of stock), the price could alternatively be the price of a single share of stock (if only one share is sold), the weighted average price of a number of shares of stock (wherein the weighting factor is any desired weighting factor), the highest price of any of the shares sold, the lowest price of any of the shares sold, or any other desired calculated value, for example. Further still, the present invention may be applied to any venue involving the buying and/or selling of one or more assets (i.e., a market). Further still, the mark-to-market calculation and payment, the dividend equivalent payment, the in-lieu-of dividend payment, the interest payment, and any other payment(s) according to the present invention may each be carried out at any desired time, such as at prearranged calendar dates and/or times, and/or periodically (e.g., daily, weekly, monthly, quarterly, semi-annually, or annually), and/or essentially continuously (e.g., by the split-second, by the second, by the minute, or by the hour in a "real-time" or quasi "real-time" manner). Further still, the CFD Writer and/or the Intermediary and/or the Agent may pre-qualify investors and/or hedge funds. The pre-qualification may include determining and/or setting up credit lines. Further still, the early termination date of the CFD and/or "loan" may be one settlement cycle from the date of notification, or the early termination date may be any desired time period after the notification. Further still, the "loan" may have no predetermined start or termination date. Further still, the present invention may be used with any desired asset(s), including, but not limited to, one or more securities or non-securities (e.g., real estate). Further still, the present invention may be used by any party having a long position in an asset and/or any party desiring to acquire short exposure to the asset and/or any intermediary and/or agent. For example, the party may be, but not limited to, an individual investor, a corporation, a charitable organization, an investment fund (e.g., a mutual fund), a lending institution, a broker, a dealer, and/or a trust. Further still, the security sold by the first party may be a currency future, for example. Further still, in one example the Intermediary may be Boston Global Advisors. Further still, while the present invention has been described principally with respect to a method for structuring a transaction, a corresponding software program and/or system may of course be utilized to structure a transaction, and/or to help to structure a transaction, and/or to carry out one or more steps of the transaction, and/or to help to carry out one or more steps of the transaction.

What is claimed is:

1. A method for structuring a transaction carried out among a first party, a second party, and a third party, comprising:

arranging a first agreement between the first party and the second party, wherein the first agreement:
i) obligates the first party to sell a security to the third party;
ii) obligates the second party to pay a first in-lieu-of dividend to the first party;
iii) requires the first periodic marking of the security sold by the first party to market; and
iv) obligates the first party to unwind the sale of the security to the third party;

arranging a second agreement between the second party and the third party, wherein the second agreement:
i) obligates the third party to buy the security sold by the first party;
ii) obligates the third party to pay a second in-lieu-of dividend to the second party;
iii) requires the second periodic marking of the security sold by the first party to market; and
iv) obligates the third party to unwind the sale of the security made by the first party;

selling the security by the first party to the third party under the obligation of the first agreement;

paying the first in-lieu-of dividend by the second party to the first party under the obligation of the first agreement;

carrying out the first periodic marking of the security sold by the first party under the requirement of the first agreement;

carrying out by the first party the unwinding of the sale of the security under the obligation of the first agreement;

buying the security by the third party under the obligation of the second agreement;

paying the second in-lieu-of dividend by the third party to the second party under the obligation of the second agreement;

carrying out the second periodic marking of the security sold by the first party under the requirement of the second agreement; and carrying out by the third party the unwinding of the sale of the security under the obligation of the second agreement;

wherein short exposure to the security is provided to the third party based upon the sale of the security by the first party.

2. The method of claim 1, wherein: (a) the first periodic marking of the security sold by the first party comprises making a first marking payment from the first party to the second party or from the second party to the first party, depending upon the price of the security at the time the security is marked-to-market; and (b) the second periodic marking of the security sold by the first party comprises making a second marking payment from the second party to the third party or from the third party to the second party, depending upon the price of the security at the time the security is marked-to-market.

3. The method of claim 1, wherein at least one of: (a) the identity of the first party is not known to the third party; and (b) the identity of the third party is not known to the first party.

4. The method of claim 1, wherein the step of obligating the first party to unwind the sale of the security to the third party includes obligating the first party to repurchase the security from the third party and the step of obligating the third party to unwind the sale of the security made by the first party includes obligating the third party to resell the security to the first party.

5. The method of claim 1, wherein the first party retains the proceeds of the sale of the security.

6. The method of claim 1, further comprising obligating the first party to make a first payment to the second party and obligating the second party to make a second payment to the third party.

7. The method of claim 6, wherein each of the first payment and the second payment is paid periodically using a period selected from the group including; a) daily; b) weekly; c) monthly; d) quarterly; e) semi-annually; f) annually; and g) at the completion of the transaction.

8. The method of claim 1, wherein each of the first in-lieu-of dividend and the second in-lieu-of dividend equals at least part of the value of any dividend paid on the security sold by the first party.

9. The method of claim 1, wherein each of the first in-lieu-of dividend and the second in-lieu-of dividend is paid periodically using a period selected from the group including: a) daily; b) weekly; c) monthly; d) quarterly; e) semi-annually; f) annually; and g) at or about the period which is correlated with the payment of any dividend paid on the security sold by the first party.

10. The method of claim 1, wherein each of the first marking and the second marking is carried out in U.S. dollars.

11. The method of claim 1, wherein each of the first marking and the second marking is carried out periodically using a period selected from the group including: a) daily; b) weekly; c) monthly; d) quarterly; e) semi-annually; and f) annually.

12. The method of claim 1, wherein the security is selected from the group including: a) at least one fixed income security; b) at least one warrant; c) at least one stock; d) at least one option; e) at least one convertible bond; f) at least one non-convertible bond; and g) at least one future.

13. The method of claim 1, wherein the security is selected from the group including: a) at least one security associated with a single stock issue; b) at least one security associated with a basket of stocks formed of a plurality of stock issues; and c) at least one security associated with a stock index.

14. The method of claim 1, wherein the first party has a long position in the security.

15. The method of claim 1, wherein the first party is an institutional investor.

16. The method of claim 1, wherein the third party is a hedge fund.

17. The method of claim 1, wherein the first party sells the security to the third party through the second party.

* * * * *